US010681299B2

(12) United States Patent
Golobrodsky et al.

(10) Patent No.: US 10,681,299 B2
(45) Date of Patent: *Jun. 9, 2020

(54) DEVICE AND METHOD FOR PROVIDING SERVICES TO A USER OF A TV SET

(71) Applicant: T-JAT SYSTEMS 2006 LTD., Petach-Tikva (IL)

(72) Inventors: Oleg Golobrodsky, Petah Tikva (IL); Gideon Drori, Sha'arei Tikva (IL)

(73) Assignee: T-JAT SYSTEMS 2006 LTD., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,275

(22) Filed: Sep. 17, 2018

(65) Prior Publication Data

US 2019/0020845 A1   Jan. 17, 2019

Related U.S. Application Data

(63) Continuation of application No. 13/319,029, filed as application No. PCT/IL2010/000319 on Apr. 22, 2010, now Pat. No. 10,110,845.

(30) Foreign Application Priority Data

May 6, 2009   (IL) .......................................... 198607

(51) Int. Cl.
*H04N 5/445* (2011.01)
*H04N 21/462* (2011.01)
(Continued)

(52) U.S. Cl.
CPC ..... *H04N 5/44543* (2013.01); *H04N 21/4622* (2013.01); *H04N 21/475* (2013.01);
(Continued)

(58) Field of Classification Search
CPC ............. H04N 5/44543; H04N 21/658; H04N 21/4882; H04N 21/4786; H04N 21/475;
(Continued)

(56) References Cited

U.S. PATENT DOCUMENTS 5,790,201 A   8/1998  Antos
5,961,603 A   10/1999 Kunkel et al.
(Continued)

FOREIGN PATENT DOCUMENTS

EP   0852361 A2   8/1998
EP   1926304 A1   11/2006
WO   2008142472 A1   11/2008

OTHER PUBLICATIONS

Anonymous, Modem, Wikipedia, May 4, 2009 (May 4, 2009), XP002595641 Retrieved from the Internet on Aug. 5, 2010.

*Primary Examiner* — Cynthia M Fogg
(74) *Attorney, Agent, or Firm* — Novick, Kim & Lee, PLLC; Jae Youn Kim

(57) ABSTRACT

A communication device is provided for enabling a TV viewer to transmit signals towards a service provider. The communication device has: a user interface adapted to receive input signal from the TV viewer; a transceiver adapted to communicate wirelessly with a service provider via a remote server; and a TV interface adapted to allow forwarding of signals received from a TV source and of signals received from a service provider, towards a TV device of the TV viewer. Preferably the signals received from both sources are displayed simultaneously within different viewing windows at the screen of the TV device.

11 Claims, 2 Drawing Sheets

(51) Int. Cl.
*H04N 21/475* (2011.01)
*H04N 21/482* (2011.01)
*H04N 21/658* (2011.01)
*H04N 21/61* (2011.01)
*H04N 21/4786* (2011.01)
*H04N 21/488* (2011.01)
*H04M 1/725* (2006.01)

(52) U.S. Cl.
CPC ....... *H04N 21/4786* (2013.01); *H04N 21/482* (2013.01); *H04N 21/4882* (2013.01); *H04N 21/658* (2013.01); *H04M 1/72527* (2013.01); *H04N 21/6143* (2013.01); *H04N 21/6181* (2013.01)

(58) Field of Classification Search
CPC ............. H04N 21/4622; H04N 21/482; H04N 21/6181; H04N 21/6143; H04M 1/72527
USPC ........................................................ 725/110
See application file for complete search history.

(56) References Cited

U.S. PATENT DOCUMENTS

| | | |
|---|---|---|
| 6,349,410 B1 | 2/2002 | Lortz |
| 6,959,449 B1 | 10/2005 | Fujil |
| 2001/0055951 A1 | 12/2001 | Slotznick |
| 2002/0010928 A1 | 1/2002 | Sahota |
| 2002/0112002 A1 | 8/2002 | Abato |
| 2002/0157101 A1 | 10/2002 | Schrader et al. |
| 2004/0133701 A1 | 7/2004 | Karaoguz et al. |
| 2004/0160460 A1 | 8/2004 | Casey et al. |
| 2004/0163126 A1 | 8/2004 | Phillips et al. |
| 2006/0130109 A1 | 6/2006 | Zenith |
| 2006/0142879 A1* | 6/2006 | Chi .................... G05B 19/0423 700/19 |
| 2007/0011604 A1* | 1/2007 | Chiu .................. H04L 29/06027 715/210 |
| 2008/0200154 A1 | 8/2008 | Maharajh et al. |
| 2009/0031384 A1* | 1/2009 | Brooks ............ H04N 21/23439 725/127 |
| 2009/0172757 A1 | 7/2009 | Aldrey et al. |
| 2010/0064025 A1 | 3/2010 | Nelimarkka et al. |

* cited by examiner

DEVICE AND METHOD FOR PROVIDING SERVICES TO A USER OF A TV SET

CROSS-REFERENCE TO RELATED APPLICATIONS

This application is a continuation of U.S. patent application Ser. No. 13/319,029, filed Dec. 20, 2011, which is an US National Phase Patent Application Under 35 USC § 371 of International Patent Application No. PCT/IL2010/000319 filed on Apr. 22, 2010, incorporated herein by reference, which claims priority of Israeli Patent Application No. 198607 filed on May 6, 2009, incorporated herein by reference.

FIELD OF THE INVENTION

The present invention relates to communications and more particularly to method, apparatus and system for providing services to a television viewer.

BACKGROUND OF THE INVENTION

When considering the percentage of the population that consumed Internet based services in various countries in early 2005, the difference between industrial countries and developing countries is clearly demonstrated. The penetration in the USA was 48%, in Canada and Australia 46%, in Sweden 53%, in Germany 36%, in the UK 38%, in France 26%, in Spain 22%, whereas in Brazil 6%, in South Africa 1.5% and in Ethiopia, Ghana, Egypt and many other counties in Africa the percentage of the population consuming Internet based services is less than 1% (source: globalEDGE—http://globaledge.msu.edu). Although data connectivity in rural communities has been found to be a factor that increases social and economical benefits of the people living in these communities, developing countries still face many barriers in providing Internet connectivity to the masses. For example, the lack of wire-line infrastructure in rural areas makes it difficult to deploy services traditionally provisioned via wire line broadband, and of course many households do not have computers.

The concept of receiving Internet web-content at the television set is relatively new but still known in the art as can be seen for example in WO 2008142472 which presents a converged communication system having the TV set as the main networked device for integrated content search, delivery and consumption. Online content is delivered from the Internet to TV, by way that traditional TV broadcasts are conveyed together with multimedia and non multimedia data retrieved from online resources, are seamlessly integrated in one delivery channel and conveyed along that channel to TV viewers.

Even though that there are some references in the art for combining Internet with television broadcasts, they do not solve the problem where there is no infrastructure available for providing the subscriber with a return (upstream) channel through which he/she may forward communications towards a non-cable TV service provider, and particularly they are not aimed to provide the user of a TV apparatus with the option to use that apparatus for simultaneously watching TV broadcasts while being interactively connected to various Internet applications.

In addition, one of the drawbacks which providers of TV broadcasts via satellite are facing, is, their lack of ability to properly communicate with their subscribers in the upstream direction. Typically, when a subscriber wishes to enquire about a certain problem being experienced (e.g. reception quality), he/she will call by telephone a service center of the satellite service provider and will explain the problem to a representative at the service center, a process which consumes substantial human resources while still being limited in options that can be offered to the subscriber.

The present invention therefore seeks to provide a solution to overcome the above-mentioned problems.

SUMMARY OF THE INVENTION

It is an object of the present invention to provide method and apparatus for providing a TV viewer with PC services.

It is another object of the present invention to provide a method and apparatus for enabling a TV viewer to retrieve requested information, even without having his/her premises connected to a wired/cable infrastructure.

It is another object of the present invention to provide a method and apparatus for combining television broadcasted signals with signals carrying information that was requested by the TV viewer, into an integrated signal and displaying the integrated signal at the viewer's TV set (e.g. in the form of a display within a larger display, or two displays located side by side, etc.).

It is another object of the present invention to provide a method and apparatus for allowing easy shift between displaying television broadcasted signals and displaying signals carrying information that was requested by the TV viewer.

It is still another object of the present invention to provide a method and apparatus that provide a viewer of satellite TV broadcasting with means to communicate with the satellite TV service provider, other than calling the satellite TV service provider's call center.

It is another object of the present invention to provide a method and apparatus for providing updated PC services to a TV viewer without requiring that the user would purchase a computer, maintain it and upgrade it every couple of years or so.

It is another object of the present invention to provide a method and apparatus for enabling a TV service provider to unicast messages/video streams to a TV viewer.

According to a first embodiment of the present invention, there is provided a communication device (e.g. a communication box) adapted to enable a TV viewer to transmit signals, wherein the communication device comprising:
(a) a user interface adapted to receive input signal from the TV viewer;
(b) a transceiver adapted to communicate wirelessly with a service provider via a remote server; and
(c) a TV interface adapted to allow forwarding of signals received from a TV source and of signals received from a service provider, to a TV device of the TV viewer.

In accordance with another embodiment of the invention, the communication device further comprises an electronic mixer adapted to combine signals received from the Internet service provider via the transceiver with TV signals broadcasted from a TV source, and wherein the TV interface is further adapted to allow forwarding the combined signals. By this embodiment, the TV interface is adapted to forwarding of signals received either from a TV source or from a service provider or a combination thereof, to the TV device.

In other words, the present invention enables the viewer to watch TV broadcasts on his/her TV screen, or to practically turn this TV set (through the use of the present invention communication device) to a computer terminal, e.g. for surfing the Internet. Optionally, by integrating the signals arriving from the two different sources as explained hereinabove, the invention also enables to display an integrated signal at the screen of the user's TV set, where the integrated signal being displayed, comprises a window for displaying the signal being broadcasted from a TV source by the service provider of the TV broadcasts, and a window for displaying data received through communications exchanged with the service provider of the Internet service, irrespective of the size of each of these two display windows. As will be appreciated, the two different service providers mentioned-above, may in fact be one service provider that provides both TV broadcasts and Internet content, but preferably, the two services will be provided in such a case along two different paths, more preferably, along two different paths, each comprising one or more links, and wherein at least one of the links comprised in one of these two paths is physically different from any link comprised in the other of the two paths. According to another embodiment of the present invention, the transceiver is further adapted to transmit a request inputted by the TV viewer towards the remote server to enable the TV viewer to receive information from the remote server (whether the information is stored at that remote server or whether it would be retrieved from elsewhere).

According to a still another embodiment of the invention, the transceiver comprises a wireless (e.g. cellular) module that is adapted for use as a relaying means for the communication device described herein.

In accordance with another embodiment of the invention, the request comprises an indication for connecting the TV viewer to an Internet-based application residing at a second server.

By still another embodiment of the invention, the user interface is further adapted to receive signals conveyed by a user device (e.g. an iPod), and wherein the electronic mixer is further adapted to combine the signals received from the user device with TV signals broadcasted from a TV source.

According to another embodiment, the transceiver is further adapted to transmit signals received from the user device towards said remote server.

According to yet another embodiment of the present invention, the communication device further adapted to be connected to at least one computer accessory (e.g. online camera, microphone etc.) to enable providing an enhanced surfing experience to the TV viewer.

In accordance with yet another embodiment of the invention, the communication device further comprises storage means. Preferably, the electronic mixer is further adapted to combine signals retrieved from the storage means with TV signals broadcasted from a TV source. Optionally, or in the alternative, the communication device is further adapted to enable displaying signals retrieved from the storage means along with TV signals broadcasted from a TV source (e.g. so that the TV screen comprises the two displaying windows).

By still another embodiment of the invention, the communication device further comprises a processor adapted to determine if a quality of the TV signals being broadcasted from a TV source is less than a pre-defined threshold, and if in the affirmative, initiating conveyance of replacement signals for these low quality TV signals towards the communication device via the remote server. The replacement signals may be the same broadcast that is being poorly received over the air, or in the alternative, could comprise different signals all together, whether these different signals are selected by the TV viewer, or not.

Although the communication device may be a stand-alone device operating parallel to the set-top box, still, according to another embodiment of the invention, the communication device is adapted to be contained in a set-top box of a TV service provider. In other words, when the set-top box is provided to the TV viewer (e.g. by the TV service provider) it already includes all or some of the functionalities described above for the communication device.

According to another aspect of the invention, there is provided a method for providing a viewer of a TV device a capability to display data at the TV device, which method comprises the steps of:

at a first server, receiving from a communication device associated with the TV device an indication denoting a request for data, wherein the communication device is operative to communicate wirelessly with the first server;

establishing a communication path between the communication device and a source for the provisioning of the requested data via the first server;

forwarding requested data towards the communication device, and displaying at the TV device, signals received from a TV source and signals comprising the requested data.

According to another embodiment of the invention, the communication device is operative to enable simultaneous display of the requested data and the TV broadcasts at the screen of the TV set, e.g. in the form of two separated windows, a picture within a picture or any other way that is known in the art per se.

In accordance with another embodiment of the invention, the requested data being forwarded in a form that would allow its integration with TV broadcasts that are being received at the communication device, in order to enable displaying the integrated signal which comprises the requested information and the broadcasted signal, at the TV device, and wherein when the integrated signal is displayed at the TV device, neither of the signals received from a TV source nor signals comprising the requested information, are displayed at the TV device.

According to another embodiment of this aspect of the invention, the method provided further comprising a step whereby the first server retrieves information which relates to the capabilities of the communication device, to enable forwarding information to the communication device in a format that is compatible with the capabilities of the communication device, and in a format that would allow integrating the information carrying signals with the TV broadcasted signals for displaying the integrated signals at the TV device.

According to an embodiment of the invention, the requested information is provided as an answer to an inquiry generated by the viewer of the TV device and is forwarded to the TV broadcasting provider via the communication device and along a path which is at least partially physically different from the path along which the TV broadcasts are received at the communication device. For example, if the TV broadcasted signals are conveyed via satellite, the communications exchanged between the TV viewer and the satellite service provider can be carried out at least partially along a link of a cellular network.

By still another embodiment, the requested information is a member of the group consisting of: an Internet application, office software, community services, stored personal information, any combination thereof, and the like.

In accordance with yet another embodiment, the method provided further comprising a step of receiving an indication about the quality of TV broadcasted signals being received at the communication device for display at the TV device, and in case that the quality of the TV broadcasted signals is less than a pre-defined threshold, forwarding replacement signals towards the communication device. Preferably, the replacement signals are essentially a copy of the TV broadcasted signals having a better signal quality.

By yet another embodiment, the method provided further comprises a step of creating a virtual client entity at the first server, wherein the virtual client entity represents the TV viewer and is operative to allow retrieval of the requested data, and wherein the communication path is established between the communication device and a source for the provisioning of the requested data via the virtual client entity residing at the first server.

According to another aspect of the invention there is provided a computer program product encoding a computer program stored on a non-transitory computer readable storage medium for executing a set of instructions by a computer system comprising one or more computer processors for carrying out a process for receiving an indication from a communication device associated with a TV device, wherein that indication indicates a request of the TV viewer to be provided with requested information, establishing a communication path between the communication device and a source for the requested information via the first server, and forwarding requested information towards the communication device. Preferably, the requested information is forwarded in a form that would allow its integration with TV broadcasts that are being received at the communication device, in order to enable displaying an integrated signal which comprises the requested information and the broadcasted signal, at the TV device, either as one combined signal or in two separated windows simultaneously being displayed at the TV screen.

By still another embodiment of this aspect of the invention, the process further comprises a step of creating a virtual client entity, wherein the virtual client entity is associated with the communication device and is operative to enable retrieval of the requested information.

DETAILED DESCRIPTION OF THE INVENTION

For a more complete understanding of the present invention, reference is made to the following detailed description taken in conjunction with the accompanying drawings.

Figure 1:
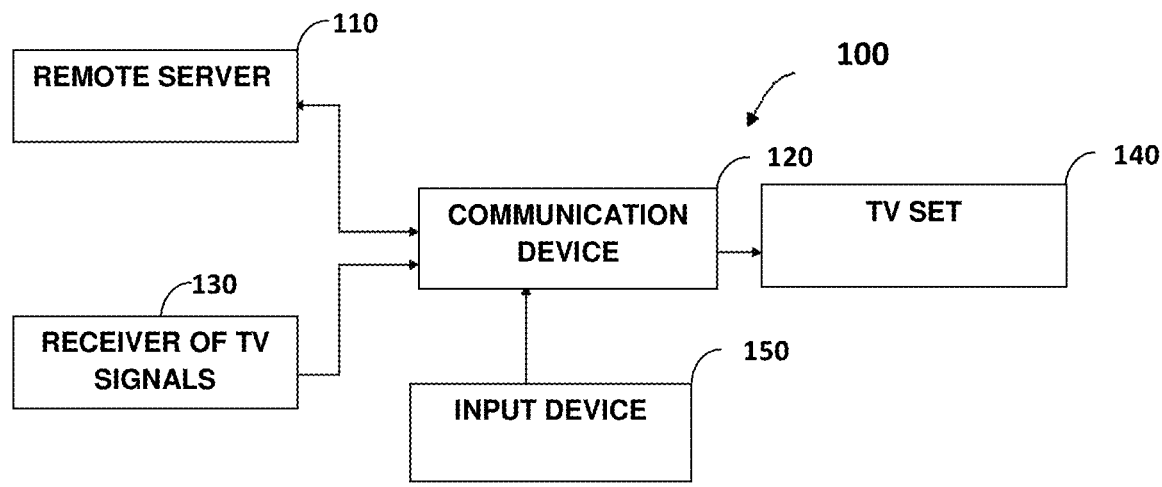
FIG. 1—presents a schematic view of the system of the present invention

Let us first consider FIG. 1, which presents a schematic view of system 100 constructed in accordance with an embodiment of the present invention.

The TV set 140 is the device which the subscriber typically uses for receiving TV broadcasts, whether such broadcasts are made via satellite, over the air or even via cables. A communication device 120 is connected to the TV set, typically (but not necessarily) by using a wired connection. At times when the TV viewer does not wish to interact while using remote server 110, this communication device may preferably be used simply to convey TV broadcasts received at TV signals' receiver 130. Such TV signals' receiver may be a TV antenna that receives TV broadcasts over the air, a satellite/cable set-top box or a VCR/DVD and the like. As will be appreciated by those skilled in the art the communication device 120 may either be connected serially to TV signals' receiver 130 or one may be comprised within the other. Either one of these configurations should be understood to be encompassed by the present invention.

The communication device is wirelessly connected to a remote server 110 to allow reception of communications directed for the viewer of the TV set. The wireless connection is preferably made by utilizing existing mobile infrastructure. In the alternative, the connection may be done through landline infrastructure for example cables or phone line. In order to enable receiving of broadcasted TV signals at communication device 120 through any one or more of the means discussed above antenna/set-top box/VCR/DVD etc., the communication device may have according to the present example an analog inlet and/or a digital one. Upon receiving the broadcasts at the communication device 120, they are transferred to TV set 140 and displayed at the screen of the TV set. However, at times when an integrated signal is to be displayed at the screen of the TV set, the broadcasted signal is displayed together with another communication signal, one that is transmitted towards the viewer of the TV set. The latter communication signal is also received at communication device 120 (e.g. via the wireless transceiver) and the integration of the two signals could be done by any method known in the art per se, e.g. PIP (picture-in-picture), modulation, etc.

The non-broadcasted signals that are received from remote sever 110, may optionally comprise communications for enabling the provisioning of PC services to the TV viewer. The term "PC services" as used herein refers to any service that a regular PC user can receive while using his/her own PC. For example: access to the Internet and to Internet based applications (e.g. instant messaging, e-mail, social networks, paying bills, banking, general information sites, government sites, etc.), office services such as writing documents, editing pictures etc., community services like on-line schooling, filling surveys, participating in events, agriculture information and the like.

Figure 2:
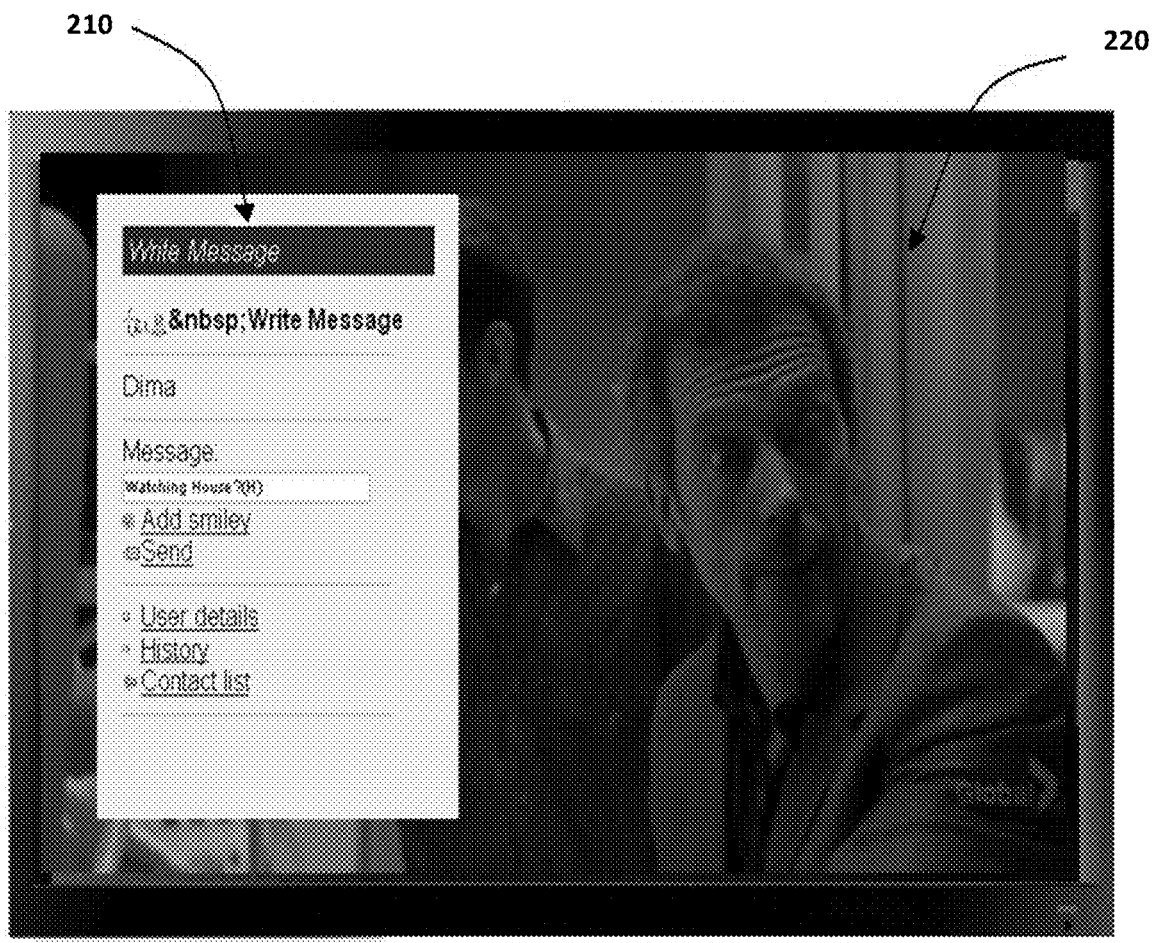
FIG. 2—presents an example of an integrated transmission displayed at the TV set.

A non limiting example of an integrated signal being displayed at the screen of the TV set is illustrated in FIG. 2, According to an embodiment of the present invention the TV viewer is able to configure/change the size and the location of the "personal" window (210) within the TV display (220) wherein the information received in the communication signal for that specific viewer, is displayed. In addition, according to a preferred embodiment of the present invention the TV viewer has a shortcut key (or a combination of keys (e.g. Alt+Tab) at the user interface of the communication device enabling him/her to switch from having a display of one signal e.g. TV broadcast at a certain channel at TV (220), to the other signal e.g. to enable him/her to chat with a friend in the Internet (210).

Reverting now to FIG. 1, according to a preferred embodiment of the present invention, a user interface 150 is comprised in communication device 120 to enable receiving the viewer inputs. The user interface is preferably designed to allow communication between communication device 120 and user input device 150. The user input device can be a keyboard possibly with a built in mouse, a remote control, etc. and it is preferably, but not necessarily, connected wirelessly to communication device 120 e.g. by using Bluetooth technology, WiFi, IR or any other applicable wire or wireless technology. The TV viewer enters his/her inputs via the user interface 150, and these inputs are being transmitted to the remote server (110) via communication device (120). In response to the TV viewer input, the remote server (110) forwards communications towards the communication device (120) where they are integrated with the signal being broadcasted at the same time on a TV channel and the integrated signal is displayed at the screen of TV set (140), thus giving the TV viewer a full experience of a real PC, with or without the option to simultaneously view a TV broadcast. According to an embodiment of the present invention the communication device is also provided with a USB port (not shown in the Figure), and the remote server (110) is adapted to remotely activate any USB device (e.g. a memory stick) connected to the communication device, in the same manner as a regular PC activates the USB device. By this embodiment, the communication device 120 is further adapted to receive signals from the USB device and integrate them with the communications forwarded from the remote server.

As mentioned above, data connectivity in rural communities is proven to increase the social and economical benefit, but many developing countries do not have the appropriate infrastructure. This, taken in conjunction with the fact that for many households the cost of a computer is too expensive, nay explain why the masses in these countries remain disconnected from the rest of the developing world. The following example illustrates a potential immediate influence on the life quality of a commoner in one of such rural communities. Let us take for example a family in a small village in one of Africa's remote and isolated regions, where there is no school in the nearby vicinity and no landline phone. The family acquires the communication device of the present invention and connects it to a television set they purchased some 10 years ago. Even though the television is old and the only broadcasts that the family can watch is with their improvised antenna, the signal received from the antenna is conveyed via the communication device and can be integrated with other communications in a manner described above. Once the communication box is operative, the family is connected to the remote server and it may start using some of options available: the children of the family may start attending classes in an on-line school, they may surf the Internet and communicate with friends and family relatives from other villages, they may receive information from the government regarding new benefits of which they could not have information prior to their connecting of the communication device, they can do some of their banking activities instead of going to the bank at the nearby city (which could be rather far away from their house), and above all their motivation to learn increases as knowledge became something accessible like it had never been before.

Figure 3:
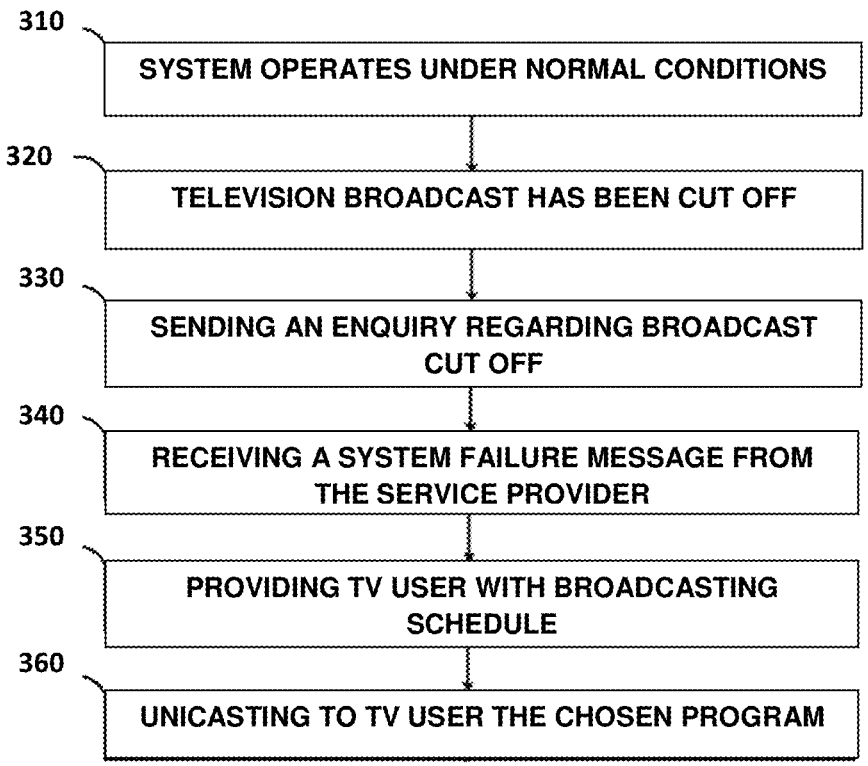
FIG. 3—presents a flow chart of an embodiment of the present invention.

FIG. 3 demonstrates another possible implementation of an embodiment of the present invention. By this example, for the simplicity of the description, all the services attributed in the preceding examples to be provided via the remote server, are provided in this example via the same server that provides satellite television broadcasts, and will be referred to in this example as the service provider server. In addition, the service provider set-top box comprises all the functionalities attributed in the previous examples to the communication device, although the service provider may also offer to old subscribers, a communication device that connects to their set-top box in the same way described above. In step 310, the system operates while the TV viewer watches a soap opera on the television and at the same time has an open chat window with two of her friends. Suddenly the television broadcast is cut off (320). The TV viewer asks her friends, with whom she is still in a chat session, if their broadcast has also been cut off. When she is told that they are still watching the program, she sends a message (330) through the communication device (by using her user input device, e.g. a keyboard) to the service provider server, enquiring why she is unable to continue watching the broadcast. In response she receives a failure message from the service provider server (340) that due to bad weather conditions, the satellite broadcasts in her neighborhood has been disrupted. This message is received from the service provider server along a path used for conveying communications to the user, such as the chat messages with her friends. Since this communication is exchanged between the TV user and the service provider along a path that is different from the one used for broadcasting (i.e. via the satellite), for example a path that extends at least partially along a cellular network, as this connection is not influenced by the satellite broadcasting mishap. Upon sending the failure message, the service provider server also sends to the TV viewer the broadcasting schedule (350) for TV programs that are available on the Internet, so when the user chooses one of the programs, say the soap opera that was interrupted, the service provider server uploads the selected program and transmits it to the user's communication device and from there to the TV set (360), through the cellular network. According to another embodiment of the present invention the service provider server is capable of determining if the quality of the TV signal being broadcasted is too low, and upon determining that this is the case, to automatically start sending the requested program through the cellular network and towards the communication device/enhanced set-top box.

By this embodiment, the use of the communication device enables the TV viewer to send messages towards the satellite service provider, and enables the TV viewer to receive uni-cast messages/video from the satellite service provider at his/her TV set, that are transmitted even along at least partially different path, which may even comprise links that extend through other media such as a cellular network, a cable network or a wire network.

As will be appreciated by those skilled in the art, the example above illustrates a certain way for implementing the present invention. However, similar examples may be devised when the remote server and the satellite service provider are two separate entities.

Figure 4:
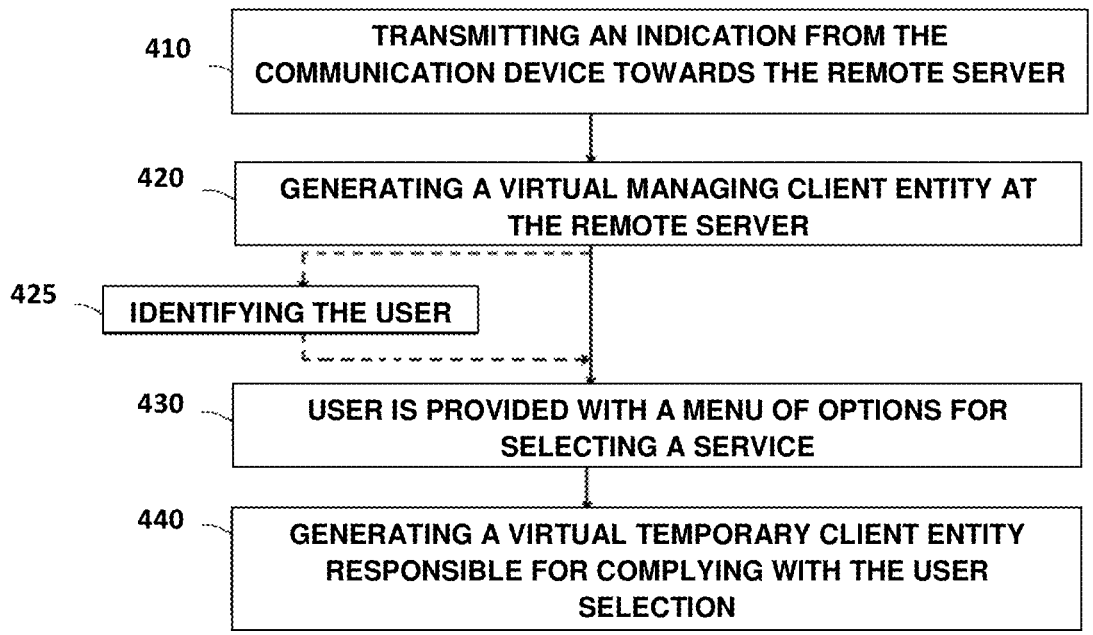
FIG. 4—illustrates a flow chart of another embodiment for carrying out the present invention.

Now, let us consider FIG. 4 which illustrates a block diagram of an embodiment of the method according to the present invention. The first step (410) is transmitting an indication, a query or a command from a user device that is connected either by wire (e.g. by a cable connected keyboard) or wirelessly (e.g. a remote control) to the communication device. The indication/command/query is then transmitted towards the remote server, indicating that the TV viewer wishes to receive a service as provided by the present invention (e.g. to receive Video on Demand (VOD) service), or wishes to pose a query to his/her TV provider. Next, the indication is received at the remote server (420). Preferably, the communication device maintains its connection with the first server for as long as the TV set is turned on, and whenever the TV viewer turns the TV on after having it turned off, the connection may be restored automatically.

The user of the TV set is then provided with a menu that is integrated by the communication device with the TV broadcast and displayed (e.g. in a small size window) onto the display of the TV screen (430). The menu presented, comprises a plurality of options enabling the provisioning of PC services to the TV viewer. The menu is presented in a user friendly way that allows the user eventually to choose which PC service he would like to use (e.g. instant messaging, e-mail, social networks, paying bills, banking, general information sites, government sites, writing documents, editing pictures, on-line schooling, filling surveys, participating in events, agriculture information and more. Information relating to the option selected by the TV viewer reaches the communication device and is then transmitted therefrom towards the first server (step 440) that will be responsible for complying with the option specified by the user's selection in step 430. The method described in this example may further optionally include an identifying step (425). Preferably, prior to sending the indication for the first time, the user has registered as a user who is qualified to receive the service according to the present invention, and once registered—his/her personal information, identification details, personal PC settings etc. are stored in a database managed by the service provider (the identification step can be in any method that is known in the art per se). Once the user has been identified, the system (i.e. either at the first server, or the user's own communication device or at another system management server) becomes aware of the access permissions to which the user is allowed and the memory space assigned to that user.

In addition, the operating system of the communication device may be provided with one or more adds-on, such as certain graphical elements, e.g. animations, etc., but preferably not with client applications themselves. The advantage of having such adds-on is to reduce the load on the communication link extending between the communication device and the remote server. By this embodiment, these elements are stored at a memory of the communication device itself as the capacity required for storing such a graphical representation is typically about 5K whereas the memory required to store for example a Java client application is 128K. If indeed a library of graphical elements is stored at the communication device, then in response to the selection of the preferred option made by the user, the virtual client entity will instruct the operating system of the communication device, which image must be pulled from the memory and integrated with the broadcasted signal. In addition, if the process requires that icon(s) be incorporated, such icons may also be pulled from the communication device's graphical library (if stored) or be transmitted to the communication device from the remote server, as the case may be. In the alternative, the graphical elements may be provided by the service provider upon a suitable request that would be initiated by the virtual client entity.

Let us now consider another embodiment of the invention, by which once the indication that is received at the remote server in step 420, a virtual managing client entity is generated (425) thereat. Thereafter, the virtual managing client entity is responsible for the management of the non-broadcasted exchange of communications with the TV viewer. Preferably, the communication device maintains its connection with the virtual managing client entity for as long as the TV set is turned on. Whenever the TV viewer turns the TV on after having it turned off, the connection may be restored automatically.

Upon generating the virtual managing client entity and associating it with the communication device, the user of the TV set is provided with a menu as described above in step 430. Information relating to the option selected by the TV viewer reaches the communication device and in this case is then transmitted towards the virtual managing client entity which initiates the generation of a virtual temporary client entity (step 445) that will be responsible for complying with the option specified by the user's selection in step 430. Since the virtual temporary client entity is an ad hoc entity generated for that specific session, once the session is terminated, the virtual temporary client entity would cease to exist.

It is to be understood that the above description only includes some embodiments of the invention and serves for its illustration. Numerous other ways of carrying out the disclosure provided by the present invention may be devised by a person skilled in the art without departing from the scope of the invention, and are thus encompassed by the present invention.

What is claimed is:

1. A communication device comprising:
   a first transceiver adapted to communicate wirelessly with a service provider via a remote server, wherein information comprised in signals unicasted from said remote server is transmitted towards said communication device;
   a second transceiver adapted to communicate with a TV broadcaster and to receive TV broadcasted signals therefrom;
   a processor configured to process the unicasted signals and TV broadcasted signals, and integrate information contained therein into one integrated TV signal; and
   a TV interface adapted to allow forwarding the one integrated TV signal to said display of the TV device such that one integrated TV signal can be displayed on the TV device;
   wherein said communication device is configured to be comprised within a TV device for use at the premise of a viewer.

2. A communication device for use at a TV viewer premises, configured to integrate at the TV viewer premises signals received from at least two different sources, so as to enable displaying of one integrated TV signal on a TV device located at the TV viewer premises, said communication device comprising:
   a user interface adapted to receive input signals from a TV viewer;
   a first transceiver adapted to communicate wirelessly with a service provider via a remote server, wherein information comprised in signals unicasted from said remote server is transmitted towards said communication device;
   a second transceiver adapted to communicate with a TV broadcaster and to receive TV broadcasted signals therefrom;
   a processor configured to process the unicasted signals and TV broadcasted signals, and integrate information contained therein into one integrated TV signal; and
   a TV interface adapted to allow forwarding the one integrated TV signal that has been integrated by said processor, directly to the TV device of said TV viewer; and
   wherein said processor is further configured to process TV broadcasted signals upon receiving said TV broadcasted signals transmitted from said remote server towards said first transceiver, have the information contained therein integrated together with said unicasted signals into one integrated TV signal, and have the one integrated TV signal forwarded to the TV device of said TV viewer.

3. The communication device of claim 2, wherein the TV broadcasted signals transmitted from said remote server, are received from said remote server via said first transceiver in response to an indication transmitted by the first transceiver and received by the remote server.

4. The communication device of claim 2, wherein said processor is further configured to determine if a quality of said TV broadcasted signals transmitted from said remote server and received by said communication device is less than a pre-defined threshold, and if in the affirmative, said first transceiver is configured to transmit a request towards said remote server to initiate conveyance of replacement signals for said TV broadcasted signals whose quality has been determined to be less than said pre-defined threshold to said communication device via said remote server, along a path being different from a path along which said TV broadcasted signals, whose quality has been determined to be less than said pre-defined threshold, are conveyed.

5. The communication device of claim 4, wherein said replacement signals for the TV broadcasted signals, whose quality has been determined to be less than said pre-defined threshold, are transmitted along a path which is at least partially a different path than a path along which said TV broadcasted signals, whose quality has been determined to be less than said pre-defined threshold, are conveyed.

6. The communication device of claim 4, wherein said different path comprises at least one link that extends through another media.

7. A method for providing a viewer of a TV device with a capability to display an integrated TV signal on a TV device, the method comprises the steps of:
broadcasting TV signals from a TV broadcaster towards a communication device comprised within said TV device, wherein said communication device is located at a TV viewer premises, and receiving the TV broadcasted signals thereat;
at a remote server, receiving from said communication device, an indication that indicates a request to be provided with information, wherein said communication device is operative to communicate wirelessly with said remote server;
establishing a communication path between said communication device and a source for said requested information via said remote server;
forwarding requested information towards said communication device within signals that are unicasted to said communication device;
integrating, by a processor comprised in said communication device, information comprised in the signals unicasted from the remote server to the communication device, with information comprised in signals broadcasted by said TV broadcaster, into said integrated TV signal; and
forwarding the integrated TV signal, directly to the TV device for display.

8. The method of claim 7, further comprising steps of receiving TV signals from said remote server, integrating, by a processor comprised in said communication device, said TV signals received from said remote server with said unicasted signals, into one integrated TV signal, and forwarding the one integrated TV signal to a TV device of said TV viewer.

9. The method of claim 8, wherein the TV signals are received from said remote server in response to an indication transmitted by said communication device and received by the remote server.

10. The method of claim 8, further comprising a step of determining if a quality of said TV broadcasted signals received from the TV broadcaster is less than a pre-defined threshold, and if in the affirmative, transmitting a request towards said remote server to initiate conveyance of replacement TV signals to said TV signals, having a quality that is less than the pre-defined threshold, via said remote server to said communication device along a path being different from a path along which said TV broadcasted signals having a quality that is less than the pre-defined threshold; are conveyed.

11. The method of claim 10, wherein said different path comprises at least one link that extends through another media.

* * * * *